W. LAWRENCE.
BEER COOLER.
No. 181,079.  Patented Aug. 15, 1876.
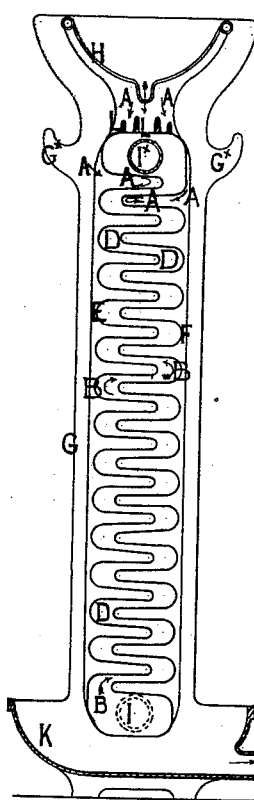
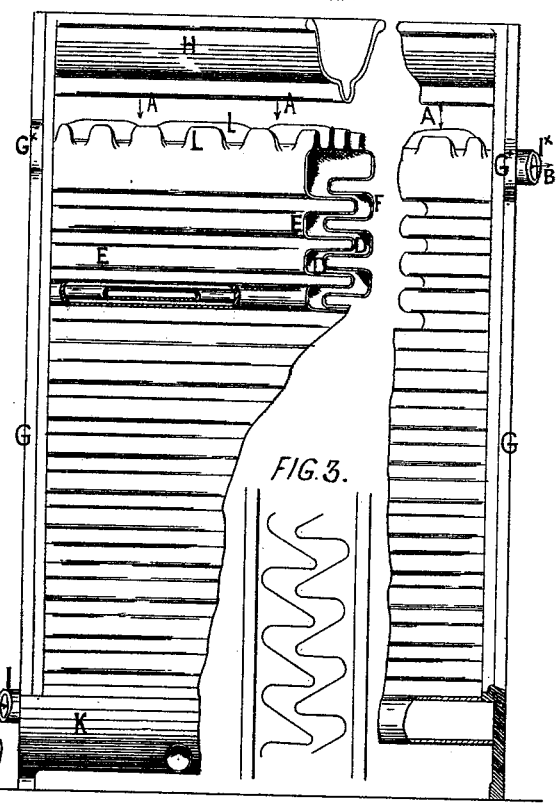
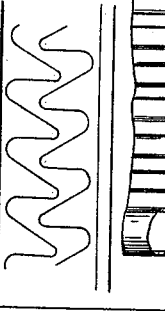

UNITED STATES PATENT OFFICE.

WILLIAM LAWRENCE, OF LONDON, ENGLAND.

IMPROVEMENT IN BEER-COOLERS.

Specification forming part of Letters Patent No. 181,079, dated August 15, 1876; application filed February 25, 1876.

*To all whom it may concern:*

Be it known that I, WILLIAM LAWRENCE, of St. Mary Axe, in the city of London, England, engineer, have invented Improvements in Apparatus for Cooling and Heating Liquids, of which the following is a specification:

The apparatus comprises a vessel or chamber having two of its sides constructed of metal, corrugated with horizontally-disposed corrugations, over or against the external surfaces of which the liquid to be cooled or heated is intended to flow by gravitation, and within which vessel or chamber water, or other liquid for cooling or heating the liquid flowing outside, is intended to flow in a broad sheet or stream against and between the internal surfaces of the metal. It will be convenient in this specification to designate the liquid flowing outside (whether brewers' worts, or milk, or whatever the liquid may be) required to be cooled or heated "external liquid," and to designate the liquid flowing internally (whether water or other cooling or heating liquid) "internal liquid." The horizontal disposition of the corrugations insures that the external liquid in its flow shall fall or flow from one to another, and thence to another, and so on, and become agitated or disturbed, and its particles in contact with the metal be continually changed.

The accompanying drawing illustrates the improved apparatus constructed as a refrigerator for cooling brewers' worts. Figure 1 is a transverse section, and Fig. 2 a side elevation, partly in section.

The arrows A and B denote the external liquid flow and internal liquid flow respectively. E and F are the two corrugated sides of the chamber, constructed of thin sheets of metal, against the external surfaces of which the external liquid flows, and D the chamber or space between them for the flow of the internal liquid. The sides E F have their corrugations nested, packed, or placed somewhat closely, those of each sheet within those of the other not touching each other, but leaving the passage D between them. They are closed or connected at top and at bottom, and are soldered or united at the ends to standards or end frames G G. These frames carry at the top a supply and distributing trough, H, having holes through its bottom for delivering the external liquid the more evenly, and for distributing it in two films or thin sheets or layers, one on each side of the apparatus, as it passes or falls or flows onto the external surfaces of the corrugations. In its course downward the external liquid is exposed to the large surfaces of the plates, and its particles in contact with them are continually changed in consequence of the eddies, ripplings, rotations, agitations, or disturbances which are set up by or caused by having to hug or run into the corrugations and over the nosings or projections between them. I and I$^\times$ are inlet and outlet pipes for the internal liquid. K is a receiving-trough, with outlet-spouts for discharge.

L L are toothings or projections, which I have found it desirable to employ to assist in the reception and equable distribution of the external liquid, when this is brewers' worts. I prefer copper as the metal to be used for the corrugated plates E F and gun-metal for the standards G G, tinning the latter for soldering to the plates; and I sometimes completely coat the external surfaces of the apparatus with tin, especially when it is intended to be used for milk, as in the modification of the apparatus hereinafter referred to. G$^\times$ G$^\times$ are horns or hooks upon the standards, upon or from which sometimes I hang screens of canvas or india-rubber, or other suitable material, while the refrigerator is in use. The use of the invention for suddenly and rapidly cooling milk as it comes from the cow I have found to be very beneficial, when the milk is intended for transit or for making butter or cheese. It would appear to arrest decomposition for a time, and in this sense I propose to purify milk and other liquids which may be subjected to the process, in some cases raising them to a high temperature previously to the cooling action. The only material difference in the apparatus to be used is the omission of the toothings or projections L L, and that the apparatus is generally made of smaller size, but with corrugations of proportionately larger size. Various sizes and proportions of the complete apparatus may be employed, according to the particular special intended uses, but for cooling worts I have found it convenient, whatever the size of the complete apparatus may be, to make the corrugations in the proportion and about twice the size of those represented in the section, Fig. 1, and for cooling milk, in the proportion and about twice the size of those represented in the accompanying model, and for cooling thick and viscid liquids, in the proportion and about twice the size of those represented in the section, Fig. 3.

Stays are to be used in the chamber D, between the corrugated plates, when the size of the apparatus so requires.

In accordance with the use of the apparatus, as described with reference to the drawing, the internal liquid, in its passage through the chamber, between the corrugated plates, will become heated, and this use—that is to say, the heating of internal liquid—may be the direct intention, rather than the consequence, of such use. But I wish it to be understood that a converse use of the apparatus is also intended; an internal liquid (or steam, in some cases) passing through the said chamber, being employed in a heated condition as the agent for heating an external liquid, or itself being passed through for the purpose of becoming cooled; an external liquid being then employed as the cooling agent, or for becoming heated itself.

The model submitted admits of experimental or illustrative use; but is to be understood as not limiting the general size and proportions of the apparatus, as these admit of very great variety. In all cases the flow of the internal liquid is upward from the bottom, and that of the external liquid downward from the top.

What I claim is—

The apparatus for cooling and heating liquids, having corrugated metal plates with horizontal corrugations, the corrugations of one plate entering the corrugations of the other plate, and forming between the plates a serpentine passage for a sheet of liquid against their inner sides, and serpentine paths for the passage of liquids in sheets on their outer sides, substantially as shown and described.

WILLIAM LAWRENCE.

Witnesses:
  J. C. HADDAN,
  FRANK W. HADDAN,
  *Of 67 Strand, in the county of Middlesex.*